(12) United States Patent
Arrighetti

(10) Patent No.: US 9,710,927 B2
(45) Date of Patent: Jul. 18, 2017

(54) METHOD AND APPARATUS FOR DETERMINING DATA ENABLING GENERATION OF A USER PROFILE

(71) Applicant: THOMSON LICENSING, Issy de Moulineaux (FR)

(72) Inventor: Walter Arrighetti, Rome (IT)

(73) Assignee: Thomson Licensing (FR)

( * ) Notice: Subject to any disclaimer, the term of this patent is extended or adjusted under 35 U.S.C. 154(b) by 103 days.

(21) Appl. No.: 14/617,833

(22) Filed: Feb. 9, 2015

(65) Prior Publication Data

US 2015/0228087 A1 Aug. 13, 2015

(30) Foreign Application Priority Data

Feb. 10, 2014 (EP) ..................................... 14305173

(51) Int. Cl.
*G06T 7/40* (2017.01)
*H04N 21/258* (2011.01)
*H04N 21/44* (2011.01)
*H04N 21/658* (2011.01)
*H04N 21/81* (2011.01)
(Continued)

(52) U.S. Cl.
CPC ................ *G06T 7/408* (2013.01); *G06T 7/90* (2017.01); *H04N 1/00204* (2013.01); *H04N 1/2166* (2013.01); *H04N 1/46* (2013.01); *H04N 9/7904* (2013.01); *H04N 21/25891* (2013.01); *H04N 21/44008* (2013.01); *H04N 21/6582* (2013.01); *H04N 21/8153* (2013.01); *G06T 2207/10004* (2013.01); *G06T 2207/10016* (2013.01); *G06T 2207/10024* (2013.01)

(58) Field of Classification Search
CPC ........... G06T 7/408; G06T 2207/10024; G06T 2207/10004; G06T 2207/10016; H04N 1/46; H04N 1/2166; H04N 1/00204; H04N 21/8153; H04N 9/7904; H04N 21/25891; H04N 21/44008; H04N 21/6582
See application file for complete search history.

(56) References Cited

U.S. PATENT DOCUMENTS 5,806,081 A * 9/1998 Swen .................. G06F 3/14
345/22
7,747,603 B2 6/2010 Apparao et al.
(Continued)

FOREIGN PATENT DOCUMENTS

EP 13306616.7 11/2013

OTHER PUBLICATIONS

Anonymous, "Metadata—Wikipedia, the free encyclopedia", http:f(en.wikipedia.org(w/index.php?title=Metadata &oldid=592477706, Jan. 26, 2014, pp. 1-13.
(Continued)

*Primary Examiner* — Yon Couso
(74) *Attorney, Agent, or Firm* — Jack Schwartz & Associates, PLLC

(57) ABSTRACT

A method for determining data enabling generation of a user profile and an apparatus configured to perform the method are described. The apparatus comprises an analyzer for analyzing one or more available images to determine image metadata related to at least one of colorimetric data and data about image capturing conditions. The determined image metadata are then made available to a user profile generator via a data interface.

36 Claims, 1 Drawing Sheet

(51) Int. Cl.
*H04N 1/00* (2006.01)
*H04N 1/21* (2006.01)
*H04N 1/46* (2006.01)
*H04N 9/79* (2006.01)
*G06T 7/90* (2017.01)

(56) References Cited

U.S. PATENT DOCUMENTS

| | | |
|---|---|---|
| 7,936,372 B2 | 5/2011 | Murakami et al. |
| 2007/0288628 A1 | 12/2007 | Sadovsky et al. |
| 2007/0288830 A1 | 12/2007 | Nakabayashi |
| 2008/0183719 A1 | 7/2008 | Kageyama et al. |
| 2008/0201299 A1 | 8/2008 | Lehikoinen et al. |
| 2009/0150330 A1 | 6/2009 | Gobeyn et al. |
| 2009/0297045 A1 | 12/2009 | Poetker et al. |
| 2010/0111489 A1* | 5/2010 | Presler ............... H04N 5/225 386/278 |
| 2012/0008876 A1 | 1/2012 | Poetker et al. |
| 2012/0177292 A1 | 7/2012 | Cheon et al. |
| 2013/0024756 A1* | 1/2013 | Basso ............... H05B 37/02 715/202 |

OTHER PUBLICATIONS

Yang et al.: "Analysis of mobile photo album by complex network method"; Jul. 2010 Application Research of Computers; vol. 27, No. 7; pp. 2540-254.

Pigeau et al: "Organizing a Personal Image Collection With Statistical Model-Based ICL Clustering on Spatio-Temporal Camera Phone Meta-Data"; Sep. 2004; Journal of Visual Communication and Image Representation 115 (3): pp. 425-445.

Search Report Dated Jun. 25, 2014.

* cited by examiner

METHOD AND APPARATUS FOR DETERMINING DATA ENABLING GENERATION OF A USER PROFILE

This application claims the benefit, under 35 U.S.C. §119 of European Patent Application No. 14305173.8, filed Feb. 10, 2014.

FIELD OF THE INVENTION

The invention relates to a method and an apparatus for determining data enabling generation of a user profile, and more specifically to a method and an apparatus for determining data enabling generation of a user profile for a user of a mobile device equipped with an image capturing device.

BACKGROUND OF THE INVENTION

There already exist many online services, usually classified as social network or photo sharing, that serve as platforms where pictures are uploaded for various purposes. When pictures are uploaded, the target servers usually scan the picture and harvest standard metadata, e.g. EXIF-based metadata (EXIF: Exchangeable Image File Format).

Current mobile or portable devices for telecommunications or computing, e.g. smartphones, tablets, laptops, etc., typically feature some sort of embedded image capturing device in order to be able to act as webcam or a still- or motion-picture camera.

In addition, digital imaging devices, from small-form compact cameras to digital single-lens reflex cameras, as well as video cameras, are equipped with some sort of networking interface card, either wired or wireless. This is in particular the case for current high-end devices.

Both categories of devices thus will more and more often have both an imaging device and a network interface. Applications running on such devices allow uploading pictures that have just been shot with the embedded camera to specific photo-collection or sharing services and social networks. Standard image metadata are transmitted as well.

Recently in the European Patent Application EP13306616.7 a solution for managing operating parameters for a display device has been proposed. Operating parameters for a display device are determined from a parameter profile for the display device and a parameter profile for content to be displayed. The determination of the operating parameters may make use of images captured by a viewer to detect viewing conditions as well as identifiers for the display device and the displayed content. Furthermore, user preferences may be taken into account. These preferences need to be specified by the user.

SUMMARY OF THE INVENTION

It is an object to propose a solution for generating a user profile for a user of a mobile device equipped with an image capturing device.

According to the invention, a method for determining data enabling generation of a user profile comprises the steps of:
analyzing one or more available images to determine image metadata related to at least one of colorimetric data and data about image capturing conditions; and
making the determined image metadata available to a user profile generator.

Accordingly, an apparatus configured to determine data enabling generation of a user profile comprises:

an analyzer configured to analyze one or more available images to determine image metadata related to at least one of colorimetric data and data about image capturing conditions; and
a data interface configured to make the determined image metadata available to a user profile generator.

Also, a computer readable storage medium has stored therein instructions enabling determining data enabling generation of a user profile, which when executed by a computer, cause the computer to:
analyze one or more available images to determine image metadata related to at least one of colorimetric data and data about image capturing conditions; and
make the determined image metadata available to a user profile generator.

The proposed solution makes use of software or a dedicated piece of hardware that processes images taken by a camera or accessible in a storage unit to extract image metadata from the images. The image metadata comprise inherent metadata of the images, e.g. metadata contained in the image headers, as well as metadata generated by processing the actual image data. Examples for the latter are color histograms, exposure information, information on white point or white balance, etc. Depending on the available data sources additional data are determined and added to the image metadata, e.g. geo-localization data or information about connected devices. The determined metadata are sent to a user profile generator, e.g. a dedicated peer or service provider, for later color- or imaging-based profiling.

Advantageously, the proposed solution is implemented on a portable device embedding both a camera and a network interface, e.g. a tablet, a smartphone, or a network camera.

DETAILED DESCRIPTION OF PREFERRED EMBODIMENTS

For a better understanding the proposed solution shall now be explained in more detail in the following description with reference to the figures. It is understood that the proposed solution is not limited to this exemplary embodiment and that specified features can also expediently be combined and/or modified without departing from the scope of the present invention.

Figure 1:
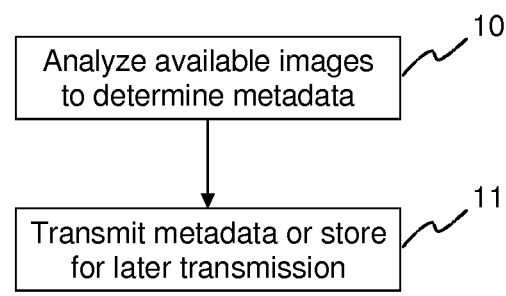
FIG. 1 schematically illustrates an embodiment of a method for determining data enabling generation of a user profile.

One embodiment of a method for determining data enabling generation of a user profile is schematically illustrated in FIG. 1. One or more available images are analyzed 10 to determine image metadata related to at least one of colorimetric data and data about image capturing conditions. The determined image metadata are then made available 11 to a user profile generator via the data interface.

Figure 2:
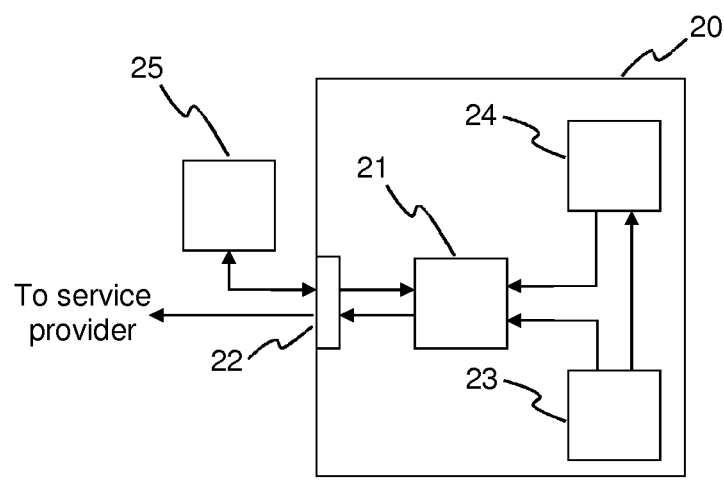
FIG. 2 schematically depicts an apparatus configured to perform the method of FIG. 1.

FIG. 2 depicts an apparatus 20 configured to perform the method of FIG. 1. The apparatus 20 comprises an analyzer 21 for analyzing 10 one or more available images to determine image metadata related to at least one of colorimetric data and data about image capturing conditions. The determined image metadata are made available 11 to a user profile generator via a data interface 22. The images are either captured by a camera 23 incorporated in the apparatus 20 or retrieved from an internal storage unit 24 of the apparatus 20 or an external storage unit 25 connected to the apparatus 20. The analyzer 21 is either implemented as dedicated hardware or as software running on a processor.

In the following the proposed solution shall be explained in more detail with reference to images captured by a camera of a mobile device provided with a network interface. Of course, as already indicated above the proposed solution may also make use of already existing photo collections of a user or of other image sources specified by a user, e.g. photo databases in a network.

A software application running on the mobile device is executed on any image captured by the embedded camera of the mobile device. Preferably, this is done immediately when the picture is taken. The application harvests a variety of metadata of the picture. Depending on the capabilities of the mobile device, e.g. the existence of an internal clock or a geo-localization module, additional metadata gathered by other sources is added. For example, location information may be determined using a GPS receiver GPS (GPS: Global Positioning System) or a radio/IP reverse-lookup software. The gathered metadata are then sent to a user profile generator, e.g. a service provider, potentially after some further elaboration of the metadata. Alternatively or in addition, the gathered metadata are stored in a memory of the device for later transmission to the user profile generator.

When a new picture is captured and transformed into an image file, e.g. JPEG (JPEG: Joint Photographic Experts Group), TIFF (TIFF: Tag Image File Format)), DNG (DNG: Digital Negative), or any camera-raw format for which the device operating system has an imaging framework for at least reading, the application is activated and reads or determines some or all of the available data.

A first source of data are inherent metadata of the captured image, such as EXIF information. For example, the inherent metadata includes information about exposure, white-balance, shooting date and/or time, colorimetric data, use of flashlights, focusing distance and/or location of focus spot(s) in the image, etc. Generally, such metadata can be read from the image file header.

Another source of data is the actual image, as will be described further below. It is retrieved from the image file data themselves and typically requires some further processing. Usually it is sufficient to read only a reduced number of data samples from the image in order to maintain a low computing footprint.

External metadata, i.e. metadata that is not directly linked to the captured image, is preferably read from the available device status files. For example, the external metadata comprises information about the geo-localization of the device, spatial information of the device, e.g. orientation or inclination, the time-zone, connected and/or running applications, etc.

Yet another source of data are the immediate actions taken on the device just after or just before the picture is taken. These data can be read from the system logs and the list of processes of the device. For example, the immediate actions taken on the device are used to decide if the information gathered on the latest processed image should be partially or completely discarded. This may be the case, for example, when the captured image is deleted again shortly after its capture.

The data retrieved from the image file data themselves advantageously include colorimetric data that are easy to compute even on devices with low computational capabilities and/or short battery life. Such data are, for example, color histograms and the minimum, maximum, and average code values for each channel along with their variance. Further examples are the image-relative gamut and apparent gamma, which are computable from both the previously mentioned data and from color-space metadata from the image header, and white balance estimation information. The latter is preferably aided by camera metadata like the white balance profile, or exposure reading from an optional light sensor or exposimeter. Also, zonal color histograms may be generated, i.e. the same information as mentioned above, but restricted to several smaller boxes partitioning the image, e.g. a 2×2, 4×4, 8×8, or 5×5 grid. The latter would be most meaningful for classic still-photography composition rules.

According to one aspect of the proposed solution, a lower-resolution RGB histogram of each shot is retained, e.g. in the form of 16/32 samples on the horizontal axis for each 8-bit channel. Average, minimum and maximum colors are retained themselves and preserved as average colorimetric preferences of the camera. Also a mosaic can be produced, with one patch showing the average color used on every picture shot so far in the device's life.

The information retrieved from immediate actions taken on the device just after or just before the picture is taken favorably includes the time lapse between a shot and the next one and/or the previous one. The time lapse is preferably considered within a range of a few minutes. For example, if some or all of the gathered colorimetric information are very similar, if not identical, which may indicate the re-shooting or alternate taking of the same composition, just the last shot's information may be used for profiling. Upon detecting exposure bracketing, where a specific in-camera setting exists, merging the colorimetric data of all the bracketed shots is possible. Furthermore, if several pictures taken one after another are then transformed into a panorama shot, or processed by a third-party application, like artistic photo-manipulation apps, the final result/shot may be considered instead of the original pictures. At least for these cases the information retrieved from the actions triggers the discarding of information gathered on preceding pictures.

Some of the above data may be missing or unrecoverable. Some or all of the remaining data are collected and bundled. The resulting data bundle is then either transmitted to the user profile generator, e.g. a destination peer, via the network interface for later profiling or stored locally in the system for a transmission at a later time. The locally stored data can also be used by the device itself for generating profiles. For example, such profiles allow for an adaptation of the device camera to the user preferences. In other words, the camera learns about the user's taste, e.g. the best sought-after look for very bright pictures, etc.

The transmission of the data to the destination peer is independent of the picture itself being considered private or shared. For example, the picture can be private, meaning that the user will not share the image with anyone, e.g. uploading it to social-networking or photo-sharing services. Still the data gathered for the picture may be used for anonymous profiling. Alternatively, the gathered data are sent to social-networking or photo-sharing services and added to the shared image as well.

The invention claimed is:

1. A method for adapting a camera of a device to user preferences, the method comprising:
   analyzing, by an analyzer of the device, one or more available images to determine image metadata related to at least one of colorimetric data of the one or more available images and data about image capturing conditions;

making, via a data interface of the device, the determined image metadata available to a user profile generator;

using, by a processor of the device, a user profile generated by the user profile generator from the determined image metadata to determine the user preferences; and adapting camera settings based on the user preferences.

2. The method according to claim 1, wherein the determined image metadata are made available to the user profile generator by one of transmitting the determined image metadata to a profiling service provider external to the device via said data interface and providing the determined image metadata to a user profile generator internal to the device.

3. The method according to claim 1, wherein the one or more images are images captured by the camera or images accessible in a storage unit.

4. The method according to claim 1, wherein the image metadata are determined from an image file header of an image.

5. The method according to claim 4, wherein the image metadata determined from the image file header comprises information about at least one of exposure, white-balance, shooting date, shooting time, colorimetric data, use of flashlights, focusing distance, and location of one or more focus spots in the image.

6. The method according to claim 1, wherein the image metadata comprises data retrieved from the image data.

7. The method according to claim 6, wherein the data retrieved from the image data comprises at least one of color histograms, zonal color histograms, minimum, maximum, and average code values for each channel along with their variance, image-relative gamut, apparent gamma, and white balance estimation information.

8. The method according to claim 1, further comprising adding external metadata gathered from other sources to the image metadata.

9. The method according to claim 8, wherein the external metadata comprises information about at least one of a geo-localization of a device used for capturing an image, orientation or inclination of the device, a time-zone, connected devices, and applications running on the device.

10. The method according to claim 1, further comprising discarding image metadata determined for an image based on actions performed on a device used for capturing the image.

11. The method according to claim 10, wherein the actions performed on the device comprise at least one of exposure bracketing, incorporation of the image into a panorama, and processing the image with an application.

12. The method according to claim 10, wherein image metadata determined for an image is discarded in case a time lapse between capturing of the image and capturing of a next image or a previous image is smaller than a threshold.

13. An apparatus configured to adapt a camera to user preferences, the apparatus comprising:

an analyzer that analyzes one or more available images to determine image metadata related to at least one of colorimetric data of the one or more available images and data about image capturing conditions;

a data interface that provides the determined image metadata available to a user profile generator; and a processor that uses a user profile generated by the user profile generator from the determined image metadata to determine the user preferences and adapts camera settings to the user preferences.

14. A non-transitory computer readable storage medium having stored therein instructions enabling determining data enabling adapting a camera of a device to user preferences, which, when executed by a computer, cause the computer to:

analyze one or more available images to determine image metadata related to at least one of colorimetric data and data about image capturing conditions;

make the determined image metadata available to a user profile generator; and use a user profile generated by the user profile generator from the determined image metadata to determine the user preferences; and adapt camera settings based on the user preferences.

15. The apparatus according to claim 13, wherein the data interface makes the determined image metadata available to the user profile generator by transmitting the determined image metadata to the profiling service provider external to the device or providing the determined image metadata to a user profile generator internal to the apparatus.

16. The apparatus according to claim 13, wherein the one or more images are images captured by the camera or images accessible in a storage unit.

17. The apparatus according to claim 13, wherein the analyzer is configured to determine the image metadata from inherent metadata of an image.

18. The apparatus according to claim 17, wherein the image metadata determined from the image file header comprises information about at least one of exposure, white-balance, shooting date, shooting time, colorimetric data, use of flashlights, focusing distance, and location of one or more focus spots in the image.

19. The apparatus according to claim 13, wherein the image metadata comprises data retrieved from the image data.

20. The apparatus according to claim 19, wherein the data retrieved from the image data comprises at least one of color histograms, zonal color histograms, minimum, maximum, and average code values for each channel along with their variance, image-relative gamut, apparent gamma, and white balance estimation information.

21. The apparatus according to claim 13, wherein the analyzer adds external metadata gathered from other sources to the image metadata.

22. The apparatus according to claim 21, wherein the external metadata comprises information about at least one of a geo-localization of a device used for capturing an image, orientation or inclination of the device, a time-zone, connected devices, and applications running on the device.

23. The apparatus according to claim 13, wherein the analyzer discards image metadata determined for an image based on actions performed on a device used for capturing the image.

24. The apparatus according to claim 23, wherein the actions performed on the device comprise at least one of exposure bracketing, incorporation of the image into a panorama, and processing the image with an application.

25. The apparatus according to claim 23, wherein the analyzer discards image metadata in case a time lapse between capturing of the image and capturing of a next image or a previous image is smaller than a threshold.

26. The non-transitory computer readable storage medium according to claim 14, wherein the instructions cause the computer to make the determined image metadata available to the user profile generator by transmitting the determined image metadata to a profiling service provider external to the device via a data interface or providing the determined image metadata to a user profile generator internal to the device.

27. The non-transitory computer readable storage medium according to claim 14, wherein the one or more images are images captured by the camera or images accessible in a storage unit.

28. The non-transitory computer readable storage medium according to claim 14, wherein the instructions cause the computer to determine the image metadata from an image file header.

29. The non-transitory computer readable storage medium according to claim 28, wherein the image metadata determined from the image file header comprises information about at least one of exposure, white-balance, shooting date, shooting time, colorimetric data, use of flashlights, focusing distance, and location of one or more focus spots in the image.

30. The non-transitory computer readable storage medium according to claim 14, wherein the image metadata comprises data retrieved from the image data.

31. The non-transitory computer readable storage medium according to claim 30, wherein the data retrieved from the image data comprises at least one of color histograms, zonal color histograms, minimum, maximum, and average code values for each channel along with their variance, image-relative gamut, apparent gamma, and white balance estimation information.

32. The non-transitory computer readable storage medium according to claim 14, wherein the instructions cause the computer to add external metadata gathered from other sources to the image metadata.

33. The non-transitory computer readable storage medium according to claim 32, wherein the external metadata comprises information about at least one of a geo-localization of a device used for capturing an image, orientation or inclination of the device, a time-zone, connected devices, and applications running on the device.

34. The non-transitory computer readable storage medium according to claim 14, wherein the instructions cause the computer to discard image metadata determined for an image based on actions performed on a device used for capturing the image.

35. The non-transitory computer readable storage medium according to claim 34, wherein the actions performed on the device comprise at least one of exposure bracketing, incorporation of the image into a panorama, and processing the image with an application.

36. The non-transitory computer readable storage medium according to claim 34, wherein the instructions cause the computer to discard image metadata determined for an image in case a time lapse between capturing of the image and capturing of a next image or a previous image is smaller than a threshold.

* * * * *